(No Model.) 5 Sheets—Sheet 2.

J. F. ADAMS.
HAY PRESS.

No. 528,755. Patented Nov. 6, 1894.

WITNESSES:
Chas. Nida.
C. Sedgwick

INVENTOR
J. F. Adams
BY
Munn & Co.
ATTORNEYS.

(No Model.)　　　　　　J. F. ADAMS.　　　　5 Sheets—Sheet 3.
HAY PRESS.
No. 528,755.　　　　　　　　　Patented Nov. 6, 1894.
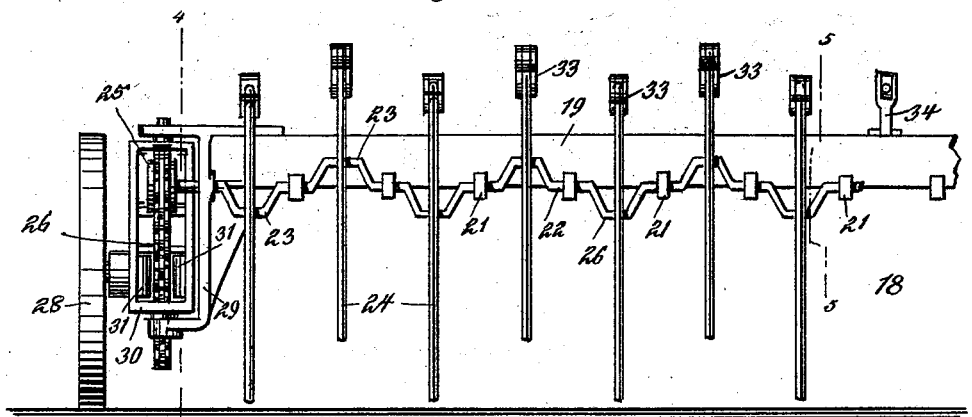
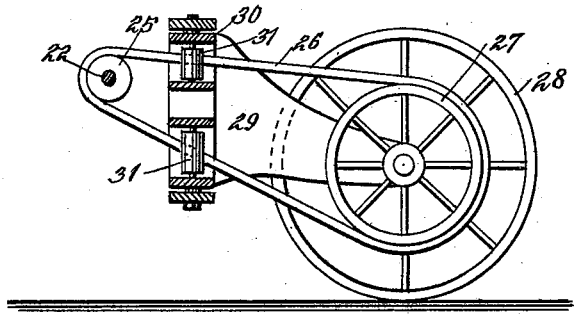
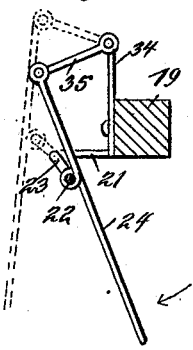
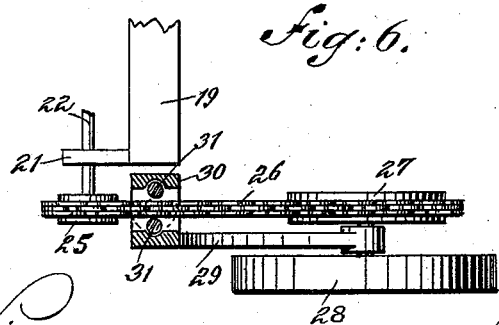
WITNESSES:　　　　　　　　　　　　　INVENTOR
Chas. Nivia.　　　　　　　　　　　　 J. F. Adams
E. Sedgwick　　　　　　　　　　　BY Munn & Co.
　　　　　　　　　　　　　　　　　　　ATTORNEYS.

(No Model.)  J. F. ADAMS  5 Sheets—Sheet 4.
HAY PRESS.
No. 528,755.  Patented Nov. 6, 1894.
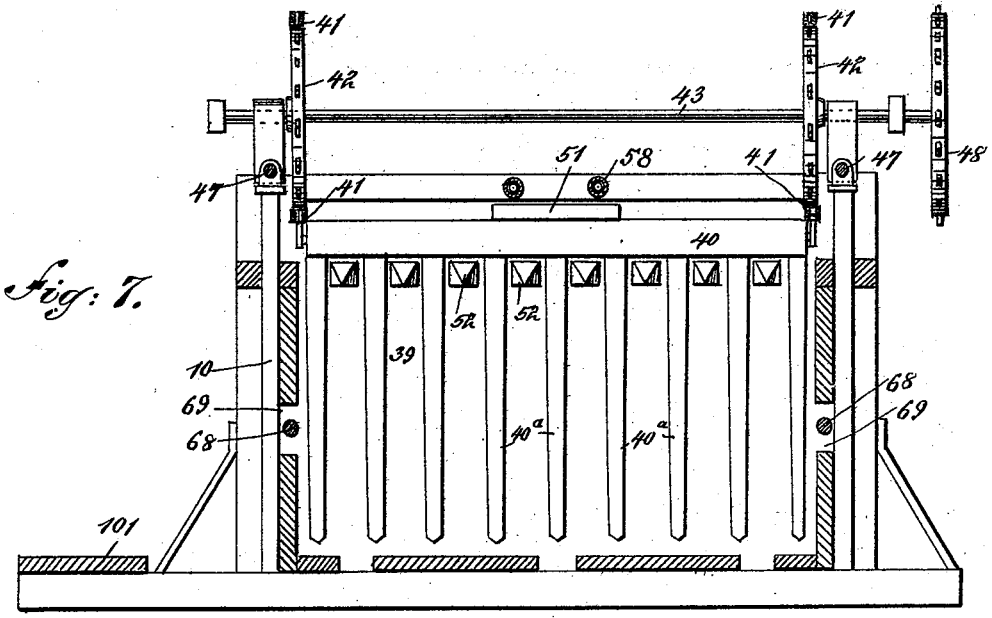
Fig: 7.
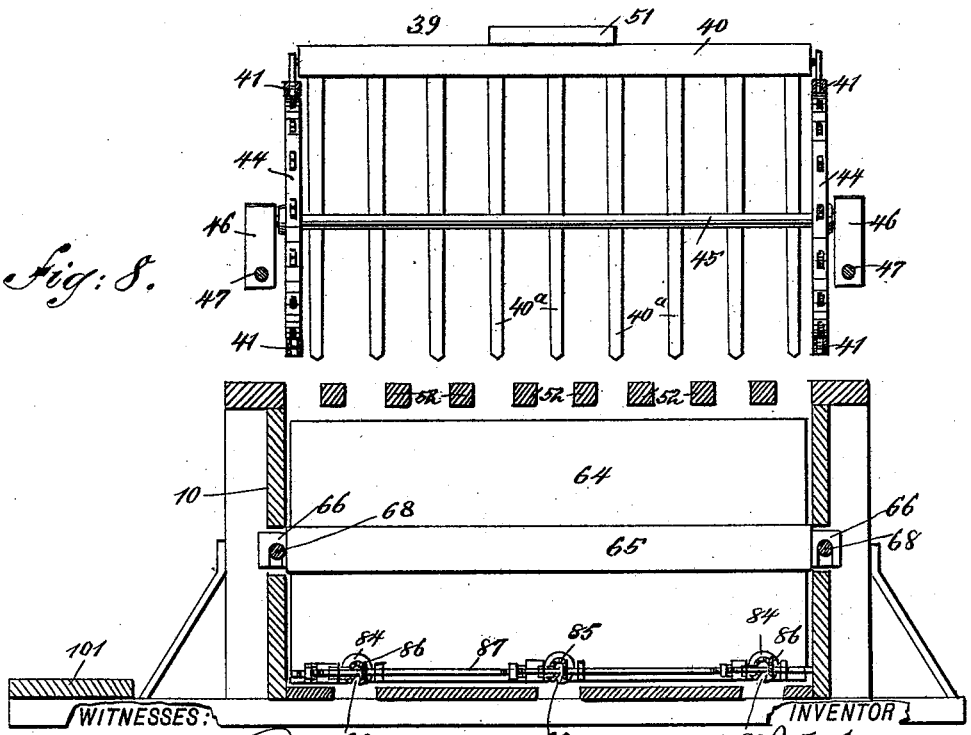
Fig: 8.
WITNESSES:  
Chas. Nida.  
C. Sedgwick.
INVENTOR  
J. F. Adams  
BY Munn & Co.  
ATTORNEYS.

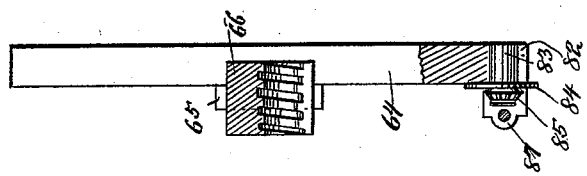

United States Patent Office.

JOHN F. ADAMS, OF ALEDO, ILLINOIS.

HAY-PRESS.

SPECIFICATION forming part of Letters Patent No. 528,755, dated November 6, 1894.

Application filed October 24, 1893. Serial No. 488,998. (No model.)

*To all whom it may concern:*

Be it known that I, JOHN F. ADAMS, of Aledo, in the county of Mercer and State of Illinois, have invented a new and Improved Baling-Machine and Rake, of which the following is a full, clear, and exact description.

My invention relates to improvements in that class of machines which are used for raking and baling hay, grain and similar products, and the object of the invention is to produce a simple machine by which hay, grain and other similar material may be raked from the field, delivered into the body of the baling machine and automatically baled and delivered in a compact bale upon the ground; also to construct the machine in such a manner that the rakes may be detached and the baling apparatus connected with the separator of a thrashing machine, so that the straw which issues from the machine may be gathered and baled.

To these ends the invention consists of certain features of construction, and combinations of the same, as will be hereinafter described and then pointed out in the claims.

Reference is to be had to the accompanying drawings, forming a part of this specification, in which similar figures of reference indicate corresponding parts in all the views.

Figure 1:
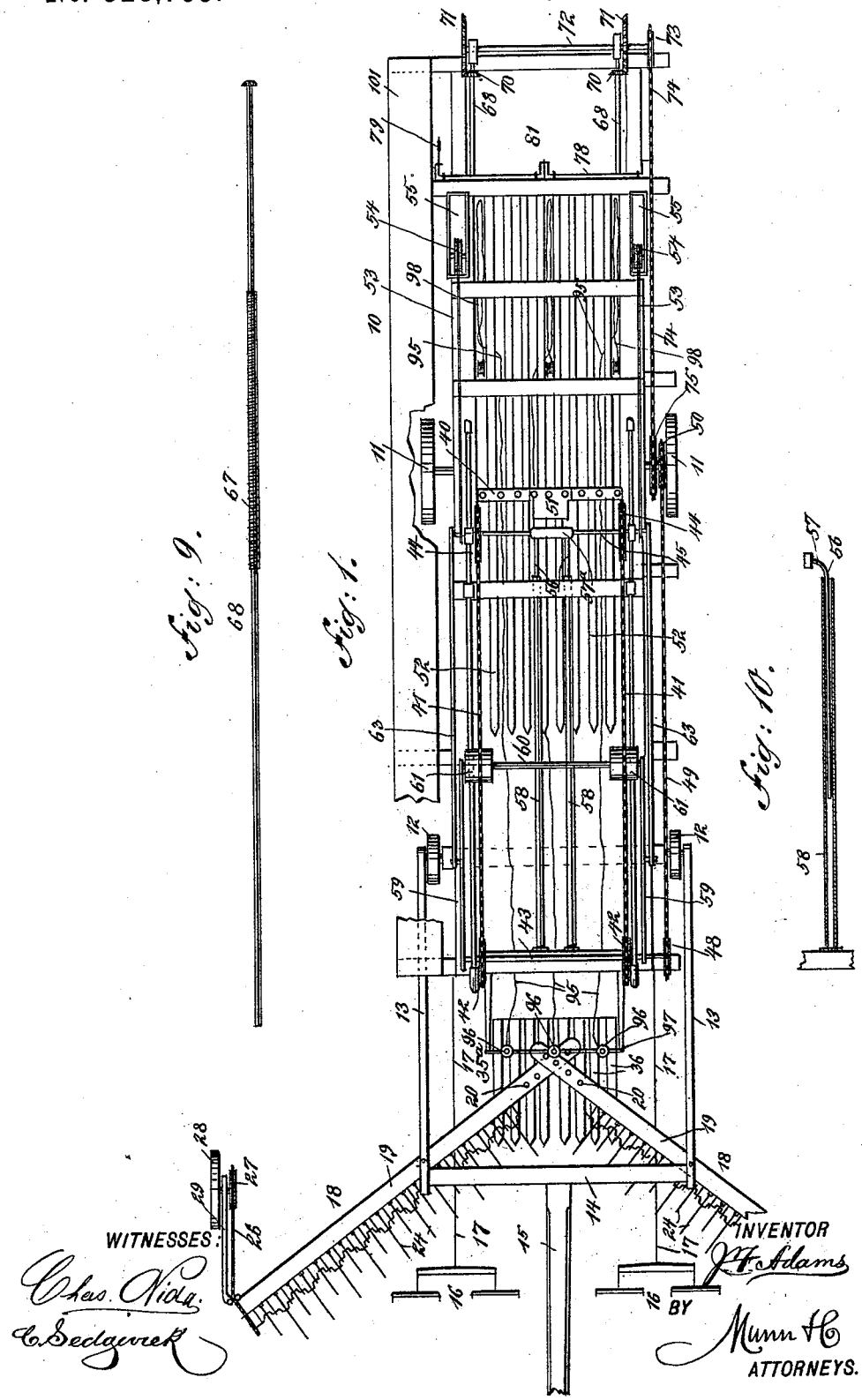
Figure 2:
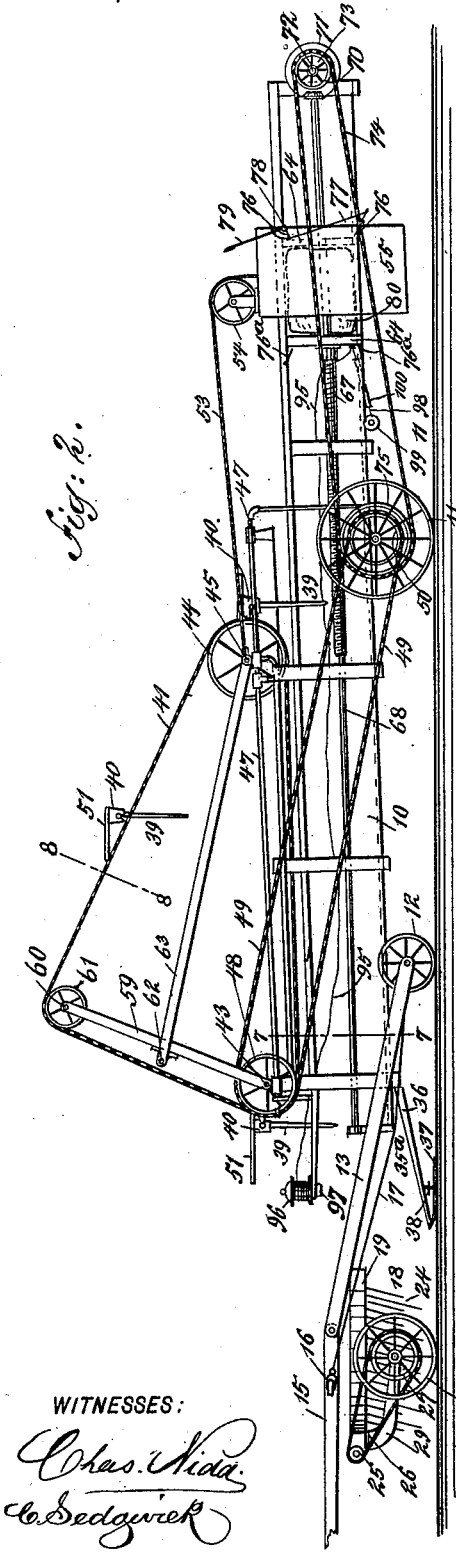
Figure 14:
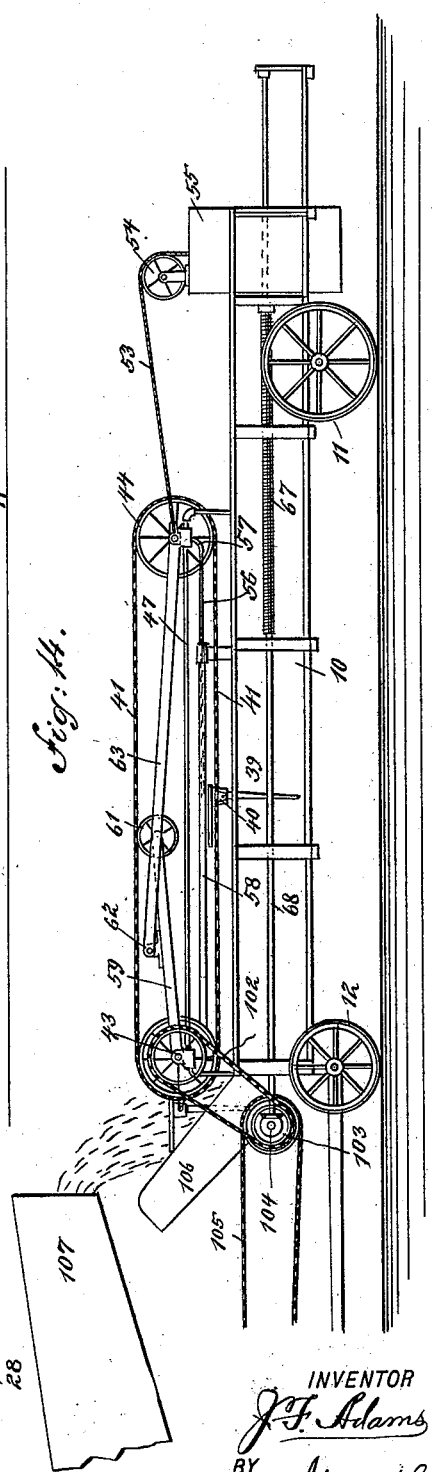

Figure 1 is a broken plan view of the apparatus embodying my invention. Fig. 2 is a broken side elevation of the same. Fig. 3 is a broken detail front elevation of a portion of one of the wing rakes at the front end of the machine. Fig. 4 is a cross section on the line 4—4 of Fig. 3. Fig. 5 is a cross section on the line 5—5 of Fig. 3. Fig. 6 is a broken sectional plan of the driving mechanism for the teeth of the wing rakes. Fig. 7 is a cross section through the baling apparatus on the line 7—7 of Fig. 2. Fig. 8 is a cross section on the line 8—8 of Fig. 2, and shows one of the carriers or combs lifted from the body of the baling machine. Fig. 9 is a detail view of one of the driving screws, which works the plungers of the baler. Fig. 10 is a detail sectional view of one of the telescopic guides used in connection with the bale tightener of the machine. Fig. 11 is an enlarged front elevation of the plunger of the baling machine showing also the wire twisting mechanism thereon. Fig. 12 is a cross section on the line 12—12 of Fig. 11. Fig. 13 is a sectional plan on the line 13—13 of Fig. 11; and Fig. 14 is a side elevation of a slightly modified form of the machine, showing the baling machine or press in connection with the separator of a thrashing machine.

The machine is provided with a long box-like body 10, open at the ends and on top, this serving as the body of the baling apparatus, and being in a general way substantially like the ordinary press box of a baling press. The box or body 10 is mounted on wheels 11 at its rear end and at its forward end on wheels 12, the axle of these wheels being connected with the box or body by a king bolt in the usual way, so as to permit the apparatus to be readily turned. This construction is not shown as it is of the customary kind.

The axle of the forward wheels 12 has its ends connected with the side pieces 13 of the drawing apparatus and these side pieces project forward and are connected to the cross bar 14 of the tongue 15 to which the team is hitched, and on opposite sides of the tongue are the double trees 16 of the usual kind, these connecting with the machine preferably by means of cables 17 and suitable eveners arranged beneath the front portion of the body or press box 10.

At the front end of the machine are wing rakes 18 which are placed at nearly right angles to each other, although the angles may be changed at will as described presently, and these rakes converge at their rear ends so as to deliver into the press box or body, as described below. The backs 19 of the wing rakes 18 are pivoted to the side pieces 13 of the drawing apparatus, and the rear ends of the backs are provided with a series of holes 20 through which pins may be inserted for fastening the ends of the rakes together and by adjusting the pins in the holes the angles of the rakes may be fixed.

Each rake back 19 is provided with forwardly-projecting bearings 21 (see Figs. 3 and 5), in which is journaled a shaft 22 having a plurality of cranks 23 thereon, each crank extending into the path of a rake tooth 24 of the rake and as these teeth are pivoted at the top, as hereinafter described, the revolution of the crank shaft causes the teeth to be alternately thrown forward so that the hay or other material in the path of the teeth is thrown in front of the central portion of the machine, and a continuous windrow is formed, which runs lengthwise into the press box or body 10. Each shaft 22, has at its outer end, a sprocket wheel 25 which connects by a chain 26 with a driving sprocket wheel 27 on the axle of the wheel 28, this wheel supporting the outer end of the rake and being journaled in the bracket 29, which bracket carries a guide frame 30 through which the chain 26 extends and in the guide frame are rollers 31 which act as guides for the chain and between which the chain runs, as shown best in Figs. 3, 4 and 6.

The teeth 24 of the rake rest against the cranks of the shaft 22, as above described, and the teeth are pivoted at their upper ends to links 35 by which they are connected to vertical supports 34 on the rake backs 19 as shown in Fig. 5, and thus sufficient play is provided for the swing of the teeth. The rake backs 19 have no teeth at their inner ends, as shown in Fig. 1, and consequently the hay which is forced backward and inward by the rake teeth passes rearward in a windrow, and is delivered upon a guide rake 35$^a$ (see Figs. 1 and 2), which rake comprises a series of parallel teeth 36 hinged to the under side and front end of the press box 10, so that the guide rake forms practically a forwardly-projecting shoe to direct the windrow of hay into the press box.

To enable the teeth 36 to ride over uneven ground without injury they are each provided with a rearwardly-extending shoe 37 which is secured to the under side of the tooth at the point, and which rides upon the ground, as illustrated in Fig. 2, the shoe being provided with a suitable nut and screw 38 connecting its body portion with the tooth above, so that the shoe may be adjusted and the point of the tooth held at any desired distance from the ground. The hay or other material delivered into the press box is carried rearward by the carriers or combs 39, each carrier or comb comprising a back 40 extending transversely across the top of the press box and a plurality of teeth 40$^a$ secured to the back and adapted to project downward into the press box. There are several of these carriers or combs, as illustrated in Fig. 2, any necessary number being used, and each carrier or comb has the ends of its back 40 secured to drive chains 41 which are arranged on opposite sides of the machine the chains passing up their front ends over sprocket wheels 42 on a transverse shaft 43, which is journaled in suitable supports on the press box and at their rear ends over sprocket wheels 44 on a transverse shaft 45 which is adapted to slide backward and forward on the press box to provide for an equal tension on the driving chains as described below. The boxes 46 of the shaft 45 are held to slide on rails 47 which are arranged on opposite sides of the press box above its top, as shown in Figs. 2 and 8.

The drive chains 41 are driven from the shaft 43 which is provided at one end with a sprocket wheel 48 and this connects by a chain 49 with a sprocket wheel 50 on the axle of the wheels 11, so that when the machine is moved, the belts 41 will continously revolve and the carriers or combs 39 be constantly moved. When traveling forward on the belts 41, the carriers or combs 39 hang loosely as shown in Fig. 2, and when moved rearward into the press box they are held in a rigid position by means of the comb set 51 with which each comb is provided and the guide bars 52 which are arranged above the press box parallel to each other and which extend from the rear portion of the press box to a point near the front end thereof, as shown clearly in Fig. 1.

The teeth 40$^a$ of the combs or carriers are adapted to project between the guide bars 52, and the comb set 51 on each comb, is adapted to slide beneath the rods 58 hereinafter described and while beneath these rods, the comb set is held in a horizontal position so that the comb teeth are rigid and carry backward the hay in the press box. The shaft 45 is normally pulled toward the rear end of the machine by means of cables 53 which are secured to the shaft near opposite ends and which extend rearwardly over guide pulleys 54 and are secured to weights 55 which hang downward, as shown in Fig. 2, and thus preserve the tension of the chains 41 which carry the combs 39.

The shaft 45 is connected to the up-turned ends 57 of the guide rods 56, these ends being boxed to the shaft, as shown at 57$^a$ in Fig. 1, and the rods extend forwardly into the hollow rods 58, extensible or telescoping rods being thus formed and these rods extending longitudinally above the top of the press box and the rods 58 being fastened rigidly to the brace as shown in Fig. 1. This construction enables the rods 58 to act as guides for the combs or carriers 39, holding the combs in a rigid position, as above described and the sliding rods 56 brace the shaft 45 and enable it to move backward and forward in accordance with the varying position of the weights 55 and the belt tightener.

The belt tightener is arranged above the press box and is intended to preserve an equal tension on the driving chains 41. The belt tightener has opposite arms 59 which are pivoted on the shaft 43 and on opposite sides of the machine and the upper ends of these arms are connected by a shaft 60 journaled in the arms and on which are mounted fast pulleys 61, which press against the upper members of the chains 41. To the central portion of these arms 59 of the belt tightener are pivoted, as shown at 62, rods 63, which extend rearward and are journaled on the shaft 45.

It will be seen that when the shaft 45 is pulled forward under the pressure of the hay which is forced into the press box, the pulley 60 will be raised so as to hold the chains 41 tight, while the rearward movement of the shaft 45 under the influence of the weights 55 causes the rods 53 and arms 59 to fold downward so as to lower the pulley 60, as shown in Fig. 14 and thus the drive chains 41 are kept at a uniform tension.

It will be observed that the weights 55 will hold the shaft 45 back until the pressure of the hay which is forced into the box exceeds the heft of the weights. The hay is pressed between plungers 64, two of which are used in the machine, and these plungers are exactly alike. When the machine is in operation, one plunger is held rigidly at the rear end of the press box, thus serving as an abutment, while the other is pressed rearwardly, as hereinafter described and these plungers change places, one being forced forward, while the other is held rigidly, as described.

The construction of the plunger is shown in Figs. 11 to 13, and each plunger is preferably provided with a metallic cross bar 65 which projects from the ends of the plunger as shown in Fig. 11, and these projecting ends 66 are bored out and formed into internally threaded nuts which are open on the under side so that the plunger may be dropped into the front portion of the press box, and the nuts may be at the same time dropped upon the driving shafts 68 which are arranged on opposite sides of the press box, and extend longitudinally thereof. The shafts are journaled in suitable supports, and that portion of each shaft which comes opposite the part of the press box in which the greatest pressure is exerted on the hay, is provided with a screw 67 which fits the nuts of the plunger 64.

It will be observed that the movement of the combs 39 as above described, forces the hay quickly into the rear end of the press box and partially compresses it, and the combs also carry a plunger quickly backward until the nuts 66 thereof engage the screws 67 after which the plungers move more slowly, but with greater force. The shafts 68, which drive the plunger, are held in slots 69 in the sides of the press box, as best shown in Figs. 7 and 8, and the shafts at their rear ends are provided with beveled pinions 70 which mesh with gear wheels 71 on the shaft 72 which is supported in suitable bearings at the rear end of the machine, and at one end of the shaft is a sprocket wheel 73 which is driven by a chain 74 connecting it with a sprocket wheel 75 on the axle of the drive wheels 11. It will be understood that any other suitable gearing may be used for turning the screw shaft from the main axle.

At the extreme rear end of the press box are catches 76 against which a plunger 64 strikes when the plunger is forced backward and the catches prevent the plunger from being pushed through the end of the box. The catches are arranged at top and bottom of the press box and are connected by shafts 77 so that the upper and lower catches may be moved in unison and the upper catches are secured to a shaft 78 which extends transversely across the upper side of the press box and to which is secured a lever 79 by which the shaft may be turned and the catches released. The bale 80 is pressed between the rear plunger and the one which is forced backward in the press box, the latter being held in its position against the formed bale by catches 76ª, as shown in Fig. 2. When the bundle or bale is formed and wired, the catches 76 are released and the bale pushed rearward into the opening 81 of the press (see Fig. 1), and it drops through to the ground.

The bale is held in the position shown in Fig. 2, between the two plungers until it is wired or tied, and this tying or wiring of the bale is effected by the following mechanism: The plunger 64 has on its lower edge, notches 82 which are adapted to be dropped upon the binding wires, as hereinafter described, thus carrying the wires to the bottom of the press box, so that they may be tied as hereinafter specified. Just above these notches are short, stout shafts or trunnions 83, which are journaled in the plunger and on one of which trunnions is a face plate 84 which is provided with a beveled pinion 85 meshing with a similar pinion 86, on the shaft 87, which shaft is journaled in suitable supports on the plunger, and extends across the face of the plunger near its lower edge, as shown in Fig. 11. The shaft 87 has squared ends 88 so that a crank may be easily attached to either end to turn the shaft and twist the wires as described below. Each face plate 84 is provided with a guide hook 89 on one edge which forms one side of the slot 90 which extends in a curved course toward the center of the face plate, the slot converging toward its inner end so that the wire may be forced into it and held there. The trunnions 83 and pinions 85 are slotted in a similar way, so that the binding wire may extend through the slots and beneath the bale. Secured to the plunger 64 adjacent to the face plates 84 are guides 91, in which are held to move chisels 92 which are parallel with the shaft 87 and on which are nuts 93 which fit the threaded portions 94 of the shaft 97 so that by turning the shaft the chisels may be advanced toward the front of the face plates or retracted as desired, and in this way the chisels may be thrown forward so as to cut off the wires which have been twisted by the revolution of the face plates.

It will be understood that any number of binding wires may be used but that a twister comprising a slotted face plate, means for turning it, and a chisel, must be provided for each pair of wires. The upper binding wires 95 are arranged on bobbins 96, which are mounted on a support 97. These wires extend longitudinally through the upper portion of the press box, as shown in Fig. 2, and their rear ends are adapted to be united with the ends of similar wires 98 which are carried on bobbins 99 on the under side and rear end of the press box, the ends of the wires 98 projecting upward through guide tubes 100 which are held in the bottom of the press box near the joint where the compressed bale 80 lies in the machine. The bobbins 96 are arranged in front of the press box and the wires 95 extend into the same, as shown in Fig. 2, so that when the ends are united with the wires 98 a loop is formed in each pair of wires, and the bale is pressed backward into this loop.

When the plunger 64 is dropped into position in the press box, the wires 95 are carried downward by the weight of the plunger and when the plunger has been pushed back into the position shown in Fig. 2, the wires 95 will be brought into close connection with the ends of the wires 98, and both wires 95 and 98 of each pair of wires will be forced upward into the slot 90, of the wire twister. Then, when the shaft 87 is revolved the wires will be twisted together by the revolving of the face plate 84, and the chisel 92 will be advanced as described, so as to sever the united wires, and the bale will be left nicely tied. The ends of the wires 98 and 95 will be left twisted together, the cut of the chisel being made through the center of the twisted portions of the wires and the next bale will be pushed into the loops of the wires in the manner already described.

The plungers are carried from the rear end of the machine to the front, as fast as the bales are formed, and to facilitate this operation, a platform 101 is arranged longitudinally on one side of the machine.

In Fig. 14 I have shown a slightly modified form of the machine, the rakes 18 and 35 being omitted, but otherwise the machine is like that already described, with the exception that power is applied directly to the shaft 43 by means of a chain 102, extending from a sprocket wheel on said shaft to a sprocket wheel 103, on a counter shaft 104, the latter being driven by a chain 105, connecting with some driving portion of the thrashing machine, and with the further exception that the press box is provided at its front end with a chute 106 which is adapted to receive the straw from the separator 107, of the thrashing machine, and deliver the straw into the press box.

In the form shown in Fig. 14, the screw shaft 68 is geared to the shaft 104, instead of being geared to the axle of the wheels 11.

From the above description, it will be seen that the machine may be drawn across a field of hay or grain, and that the said material is raked and automatically baled and that, if desired, the baling machine or press may be connected with a thrashing machine, so as to receive the straw delivered by the machine and bale it automatically.

Having thus fully described my invention, I claim as new and desire to secure by Letters Patent—

1. The combination, with the frame of the machine, of the rakes pivoted to the sides of the frame to swing in essentially horizontal planes, the rakes extending inwardly beyond their pivots toward the center of the machine, and the aggregate length of the inner portions of the rakes being greater than the distance between their pivots, so that the inner portions of the rakes may be in contact with one another in different angular positions of the rakes, and means, adapted to engage with the inner portions of both the rakes, to adjustably connect them with each other, substantially as described.

2. A machine of the kind described, provided with rakes pivoted to the sides of the machine and having a series of apertures at their inner ends for the reception of pins to adjustably connect the rakes and hold them in position, as and for the purpose set forth.

3. The combination, with the frame of the machine, of the rake backs pivoted to the sides thereof to swing in essentially horizontal planes, the rake backs extending beyond their pivots toward the center of the machine, and having apertures for the reception of pins to adjustably connect the inner ends of the rake backs at approximately the center of the machine, and rake teeth secured to the rake backs both exteriorly and interiorly of their pivots, the innermost rake teeth being placed at a distance outward from the connecting points of the rake backs, so as to leave an adjustable free space or throat between the rakes, substantially as described.

4. The combination, with the rake having a pivotal connection to the machine, the swinging rake teeth, and the revoluble crank shaft journaled on the rake for moving the teeth thereof, of a supporting wheel, a sprocket connection between the said supporting wheel and the crank shaft, and guiding rollers for the chain of the sprocket mechanism to keep the said chain in alignment with the sprocket wheels when the rake is turned about its pivot, substantially as described.

5. The combination, with the rake having a pivotal connection to the machine, the swinging rake teeth, and the revoluble crank shaft journaled on the rake for moving the teeth thereof, of a supporting wheel, a sprocket connection between the said supporting wheel and the crank shaft, a bracket in which the said wheel is journaled, and vertical guiding rollers located in the said bracket to keep the chain of the sprocket mechanism in alignment with the sprocket wheels when the rake is turned about its pivot, substantially as described.

6. The combination, with the press box, an abutment at the rear end thereof, and the baling plunger adapted to travel in the rear part of the press box, of a belt or conveyer arranged to travel longitudinally of the press box in advance of the plunger, and provided with projections adapted to enter the press box and pack the material while carrying it toward the rear end of the press box, and a feed device located at the opposite end of the belt from the plunger, substantially as described.

7. The combination, with the press box, of the parallel shafts arranged transversely above it, one shaft being held in stationary bearings and the other in bearings slidable longitudinally of the press box, extensible guide rods arranged above the box and connected with the slidable shaft, chains carried by the shafts, and combs secured to the chains and adapted to engage the said guide rods and enter the press box, substantially as described.

8. The combination with the press box, of the parallel shafts arranged transversely above it, one shaft being held in stationary bearings and the other in bearings slidable longitudinally on the press box, extensible guide rods arranged above the box and connected with the slidable shaft, chains carried by the shafts, combs secured to the chains and adapted to enter the press box, and an automatic belt tightener for preserving the tension of the chains, substantially as shown and described.

9. In a machine of the kind described, the combination with the press box, the parallel shafts above it, one being held in stationary bearings and the other in slidable bearings, chains connecting the shafts, combs carried by the chains and adapted to enter the press box, means, as the weights and cables, for moving the slidable shaft in one direction, and a belt tightener connected with the two shafts and provided with pulleys to press against the chains, substantially as shown and described.

10. In a machine of the kind described, the combination with the press box, and the parallel shafts thereon, one shaft being held in stationary and the other in movable bearings, means, as the weights and cables, for moving the slidable shaft in one direction, and a belt tightener comprising a pair of arms pivoted on the stationary shaft and provided with pulleys to press against the chains, and rods pivoted to the movable shaft and to the aforesaid arms, substantially as shown and described.

11. The combination with the press box, of screw shafts arranged longitudinally on opposite sides of the box, a plunger to slide in the box, and nuts secured to the plunger and adapted to ride on the screw shafts, substantially as shown and described.

12. The combination with the press box, of the longitudinal screw shafts on the sides of the box, the plunger arranged to slide in the box, and the nuts on the ends of the plunger to engage the screw shafts, the nuts being open on their under sides, substantially as shown and described.

13. The combination with the press box, of shafts journaled on the sides of the box and provided with screws at points opposite the rear portion of the press box, the plunger to slide in the box, nuts on the end of the plunger to engage the shafts and the screws thereon, and mechanism for carrying the plunger rearward to the screws, substantially as shown and described.

14. The combination with the plunger, of the revoluble radially-slotted face plate journaled on the plunger, and means, as the crank shaft and gear mechanism, for revolving the face plate, substantially as shown and described.

15. The combination with the plunger, of a revoluble face plate journaled thereon and provided with a slot the sides of which converge toward the center of the face plate, the gear mechanism for revolving the face plate, and a cutting-off chisel held to slide at an angle to the axis of the face plate, substantially as shown and described.

16. The combination with the open ended press box, of plungers held to slide in the press box, and catches at the rear end of the box to engage the plungers, substantially as shown and described.

JOHN F. ADAMS.

Witnesses:
DEAN C. SMITH,
THOMAS G. COOK.